US012168250B2

(12) United States Patent
Kehn

(10) Patent No.: US 12,168,250 B2
(45) Date of Patent: Dec. 17, 2024

(54) WASH RING FOR CHEMICAL TANKS

(71) Applicant: SWIMC LLC, Cleveland, OH (US)

(72) Inventor: Patrick M. Kehn, Dallas, TX (US)

(73) Assignee: SWIMC LLC, Cleveland, OH (US)

( * ) Notice: Subject to any disclaimer, the term of this patent is extended or adjusted under 35 U.S.C. 154(b) by 387 days.

(21) Appl. No.: 17/452,109

(22) Filed: Oct. 25, 2021

(65) Prior Publication Data

US 2022/0134394 A1 May 5, 2022

Related U.S. Application Data

(60) Provisional application No. 63/198,625, filed on Oct. 30, 2020.

(51) Int. Cl.
*B08B 9/08* (2006.01)

(52) U.S. Cl.
CPC .......... *B08B 9/0804* (2013.01); *B08B 9/0813* (2013.01); *B08B 2209/08* (2013.01)

(58) Field of Classification Search
None
See application file for complete search history.

(56) References Cited

U.S. PATENT DOCUMENTS

| | | | |
|---|---|---|---|
| 2,947,482 | A | 8/1960 | Lione |
| 3,878,857 | A | 4/1975 | Heibo |

FOREIGN PATENT DOCUMENTS

| | | | |
|---|---|---|---|
| CN | 208419634 | U | 1/2019 |
| CN | 109289747 | A | 2/2019 |
| CN | 208925335 | U | 6/2019 |
| CN | 209109773 | U | 7/2019 |
| CN | 209156649 | U | 7/2019 |
| CN | 209556108 | U | 10/2019 |
| CN | 110615516 | A | 12/2019 |

*Primary Examiner* — Levon J Shahinian

(57) ABSTRACT

A wash ring for cleaning a tank. The wash ring comprises a curved surface having an inner edge and an outer edge. The wash ring further comprises an inner wall having a first height and an outer wall located between the inner end and outer end and having a second height that is less than the first height. A plurality of notches is located at the outer edge of the curved surface. The wash ring has a feed pipe with an outlet located between the inner wall and outer wall.

18 Claims, 3 Drawing Sheets

WASH RING FOR CHEMICAL TANKS

TECHNICAL FIELD

The present disclosure relates generally to cleaning tanks.

BACKGROUND

Tanks can be employed for storing solids, liquids, or gasses and for mixing or blending chemicals and products such as paint. Contaminants can accumulate on the inner tank wall surface which must be periodically cleaned.

SUMMARY OF EXAMPLE EMBODIMENTS

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein a tank wash ring, or simply "wash ring", which in an example embodiment has a curved surface having an inner edge and an outer edge. The wash ring further comprises an inner wall having a first height and an outer wall located between the inner end and outer end and having a second height that is less than the first height. A plurality of notches is located at the outer edge of the curved surface. The wash ring has a feed pipe with an outlet located between the inner wall and outer wall.

In accordance with an example embodiment, there is disclosed herein, an apparatus comprising first and second semi-circular curves surfaces that have inner and outer edges where the outer edges are shaped to abut the inner wall of a tank, inner and outer walls where the inner walls are higher in height than the outer walls, the and a feed pipe with an outlet located between the inner and outer walls. Notches are disposed at the outer edges of the first and second semi-circular curved surfaces. Flanges with mounting holes can be disposed at the ends of the semi-circular curved surfaces for coupling the semi-circular, curved surfaces together.

In accordance with an example embodiment, there is disclosed herein a method for cleaning a tank that comprises providing a liquid through a feed pipe onto a curved surface with an inner surface and outer surface, an inner wall and outer wall located between the inner wall and the outer surface, the inner wall and outer wall forming a curved trough where the inner wall of the curved surface is higher than the outer wall of the curved surface. The accumulates in the trough until it reaches a sufficient height to pass over the outer wall onto the outer surface, the outer surface has a plurality of notches and abuts against a tank wall. The liquid is guided to the plurality of notches and flows through the plurality of notches that causes the liquid to move along an inner wall of a tank.

BRIEF DESCRIPTION OF THE DRAWINGS

The accompanying drawings incorporated herein and forming a part of the specification illustrate the example embodiments.

DESCRIPTION OF EXAMPLE EMBODIMENTS

Figure 1:
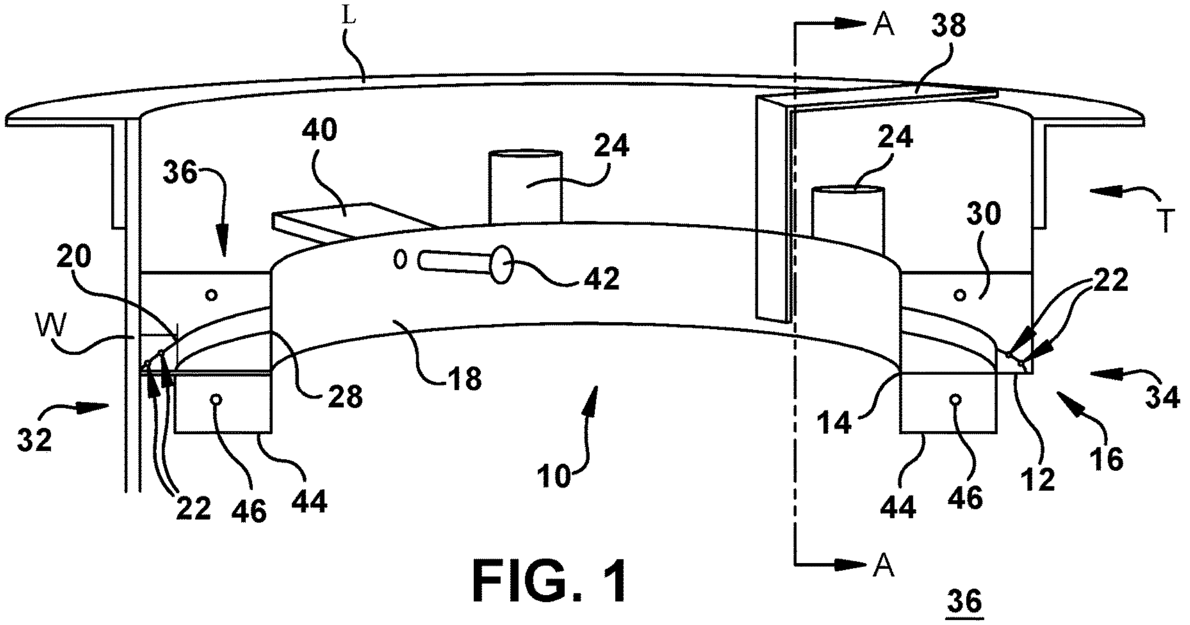
FIG. 1 is an isometric view illustrating an example of a wash ring in accordance with an example embodiment.

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Figure 2:
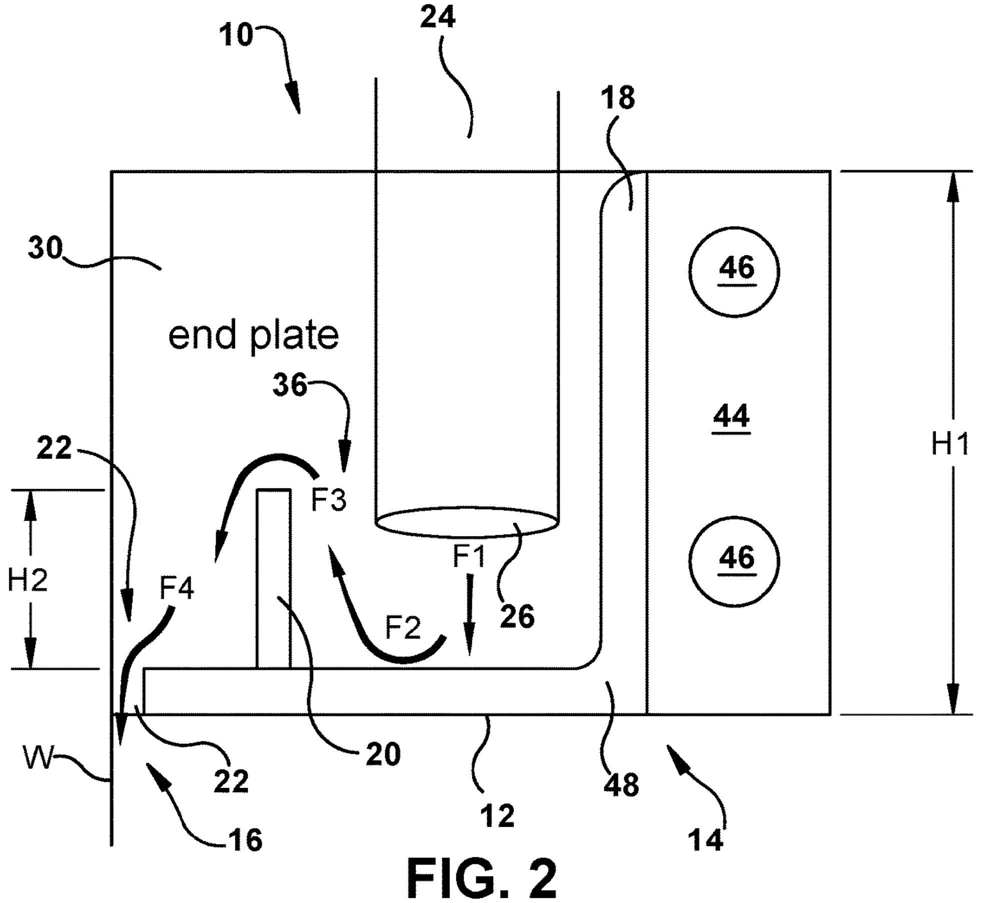
FIG. 2 is a cutaway of the wash ring in FIG. 1 along line A-A.

Referring to FIGS. 1 and 2 there illustrated an example of wash ring 10 that is curved in accordance with an example embodiment. The wash ring 10 comprises a bottom surface 12 with an inner edge 14 and an outer edge 16. An inner wall 18 having a first height H1 is located at the inner edge 14 of bottom surface 12. An outer wall 20 having a height H2 that is lower than the height H1 of the inner wall 18 is located between the inner wall 18 and the outer edge 16. A plurality of notches 22 are located at the outer edge 16 of the bottom surface 12 (see also, FIG. 4). The notches 22 can be any desired size or shape and can be disposed anywhere along the outer edge 16, or can be disposed along the entire outer edge 16, The wash ring 10 further comprises a feed pipe 24 having an outlet 26 that is located between the inner wall 18 and the outer wall 20.

In the illustrated example, the bottom surface 12 is an arc that is less than 360 degrees. End caps 28 and 30 are placed at the first 32 and second 34 ends of the bottom surface 12. The volume enclosed by inner wall 18, outer wall 20, first end cap 28, and second end cap 30 form a trough 36 that can retain liquids. However, those skilled in the art can readily appreciate that if bottom surface 12 is 360 degrees end caps 32, 34 would not be necessary in order to form a trough 36 between the inner wall 18 and outer wall 20.

In an example embodiment, the outer edge 16 abuts an inner wall W of a tank T. This will cause liquid at the outer edge 16 to flow in the notches 22 between the outer edge 16 and the tank wall W.

In an example embodiment, an L-shaped bracket 38 is employed to hold the wash ring 10 inside the tank T. In the illustrated example, an L shaped bracket is attached to the inner wall 18 of the wash ring 10 and the lip L of the tank is shown. However, those skilled in the art can readily appreciate that other types of brackets can be employed such as a pair of brackets (one affixed to the bottom surface 12 and the other to the lip L) and a bolt or jack bolt, or a U shaped bracket. Any suitable technique can be employed for affixing the bracket 38 onto the wash ring 10, such as for example welding or fasteners.

In an example embodiment, a support bracket 40 can be deployed between the inner wall 18 and the tank wall W. A fastener 42 can be employed to hold the support bracket 40 in place.

In an example embodiment, flanges 44 are located at the ends 32, 34. The flanges can have one or more mounting holes 46 positioned to mate with an adjacent wash ring 10. The location of the flanges 44 and mounting holes 46 can be at any desired location. For example, in FIG. 1 the flanges 44 are located below the bottom surface 12, and in FIG. 2, the flanges 44 are located along inner wall 18. Those skilled in the car can readily appreciate that a combination of flanges (such as the flanges illustrated in FIG. 1 and the flanges illustrated in FIG. 2) can be employed.

In the illustrated example, the bottom surface 12 is a curved surface, however, those skilled in the art can readily appreciate that the bottom surface 12 can be any suitable shape such as circular, semi-circular, or a curved surface at an angle less than 360 degrees. In other embodiments, the surface can have another shape to abut the edge of the tank wall, such as for example the bottom surface 12 can be straight or have straight and curved segments, or curved segments having constant or different radiuses.

In the illustrated example the inner wall 18 and bottom surface 12 are formed from one piece and the inner wall is located at the inner edge 14 of the bottom surface 12. However, those skilled in the art can readily appreciate that the bottom surface 12 and inner wall 18 can be separate pieces and that the inner wall 18 can be located at any desired position between the inner edge 14 and outer wall 20.

In the illustrated example, the wash ring 10 has two feed pipes 24. However, those skilled in the art can readily appreciate that this is merely for ease of illustration and that the wash ring 10 may have any physically realizable number of desired feed pipes.

In an example embodiment, tank wall W is cleaned by providing a (e.g., liquid) cleaning solvent into feed pipe 24 that exits feed pipe 24 at outlet 26 . . . intro trough 36 as illustrated by arrow F1. The liquid accumulates in the trough 36 and increases in height as illustrated by arrow F2. As the liquid reaches the height of the outer wall 20, the liquid passes over the outer wall onto the outer edge 16 of the wash ring 10 as illustrated by arrow F3. The liquid flows to the edge 16 of the wash ring and flows through notches 22 as indicated by arrow F4. In an example embodiment, the flow of the liquid through the notches 22 causes the liquid to continuous flow similar to a waterfall along the inner tank wall. In particular embodiments, the liquid adheres to the inner tank wall while flowing through the tank.

Figure 3:
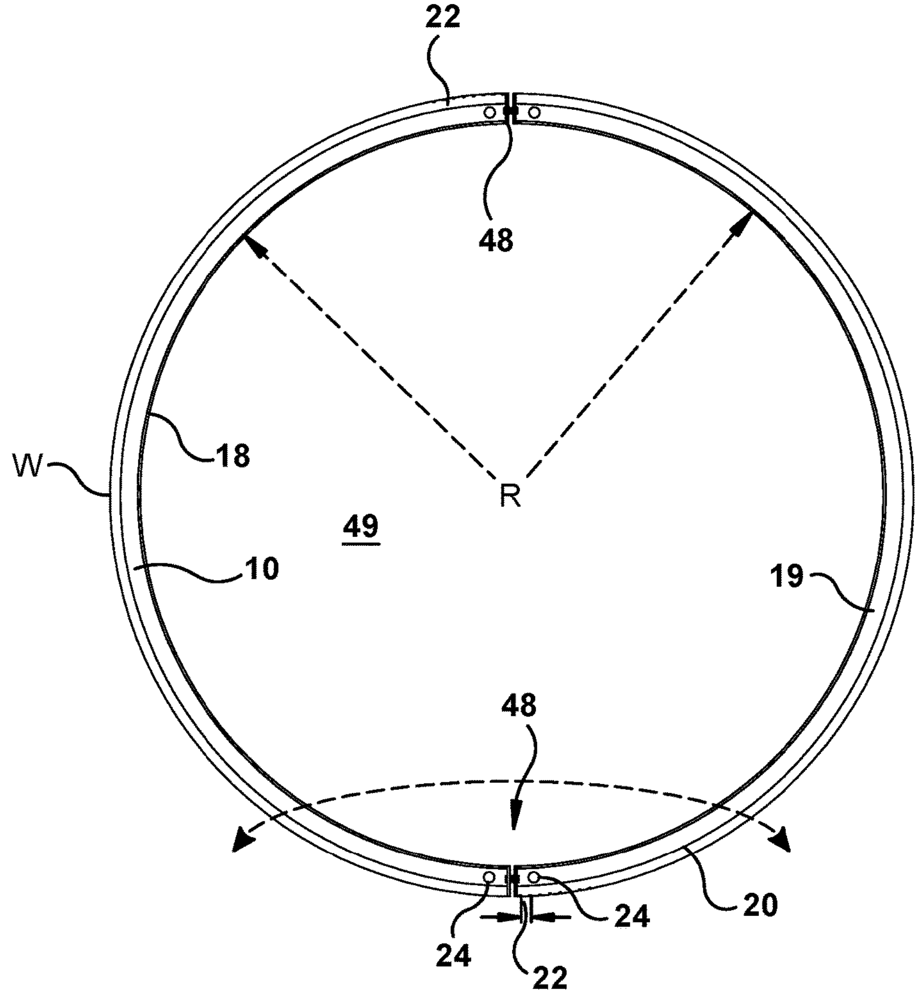
FIG. 3 illustrates an example of a wash ring that employs two semi-circular wash rings.
Figure 4:
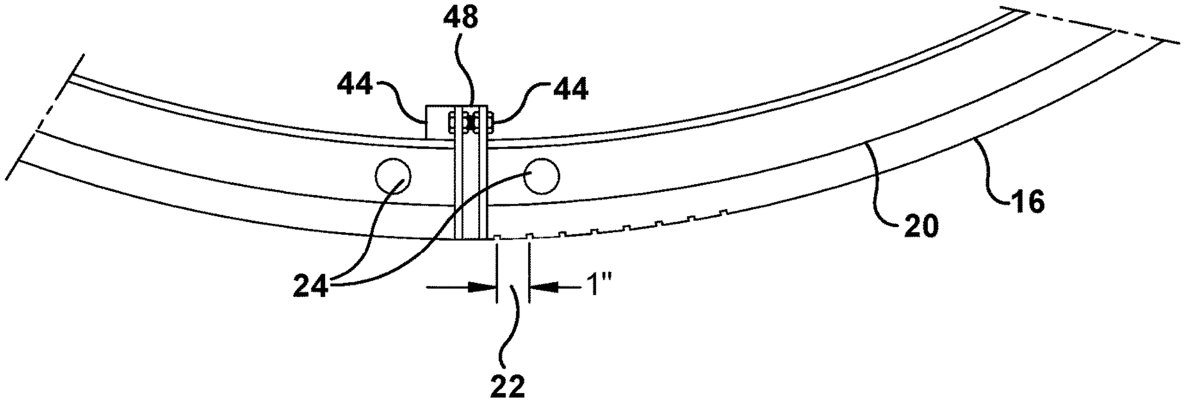
FIG. 4 is a cutaway of the wash ring in FIG. 3 along curve B-B.

FIGS. 3 and 4 illustrates an example of a tank cleaning system 49 that employs two curved, semi-circular (180 degree) wash rings 10. In the illustrated example, the tank is circular in shape, thus the wash rings 10 have a constant radius R. The semi-circular wash rings 10 are coupled together by flanges at the ends of the wash rings 10. In an example embodiment, jack bolts are employed to force the outer edge 16 of the semi-circular wash ring 10 against the tank wall W.

In an example embodiment tested by the applicant, the bottom surface 12 and inner wall 18 are formed out of 3"×3"×¼" angle rolled edge Stainless Steel (SS). The outer wall 20 is 18 is ⅛"×1" SS flat stock. The feed pipe 24 is 1"×¼" SS. The notches 22 notches are ⅛"×⅛" and are spaced one inch apart along the edge 16 of the wash ring 10.

Figure 5:
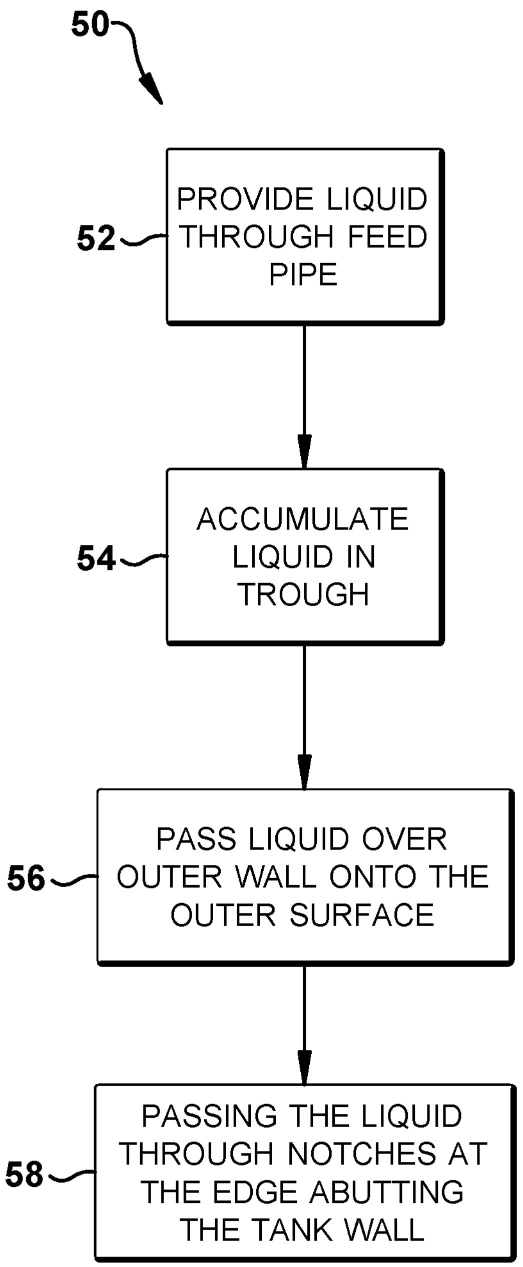
FIG. 5 is a block diagram illustrating a methodology that can be implemented by the wash rings illustrated in FIGS. 1-4.

In view of the foregoing structural and functional features described above, a methodology 50 in accordance with an example embodiment will be better appreciated with reference to FIG. 5 While, for purposes of simplicity of explanation, the methodology 50 of FIG. 5 is shown and described as executing serially, it is to be understood and appreciated that the example embodiment is not limited by the illustrated order, as some aspects could occur in different orders and/or concurrently with other aspects from that shown and described herein.

At 52, a liquid is provided through a feed pipe onto a surface of a wash ring that abuts an inner wall of a tank. The wash ring having an inner surface and outer surface, an inner wall and an outer wall located between the inner wall and the outer surface. The inner wall and outer wall forming a trough. The inner wall of the surface is higher than the outer wall of the surface. FIGS. 1-4 provide examples of a suitable wash ring. An example of the liquid flowing through a feed pipe onto the surface is illustrated by arrow F1 in FIG. 2. In an example embodiment, the liquid is a cleaning solvent A 54, the liquid accumulates in the trough. The liquid increases in height in the trough as liquid is added via the feed pipe. Arrow F2 in FIG. 2 provides an example of the liquid accumulating in the trough.

Once the liquid has accumulated to the top of the outer wall (e.g., outer wall 20 in FIG. 2), at 56, the excess fluid passes over the outer wall onto the outer edge of the wash ring. The outer edge has a plurality of notches and abuts against the tank wall. FIGS. 1-4 provide an example of an outer that abuts a tank wall and has a plurality of notches. Arrow F3 in FIG. 2 provides an example of excess liquid flowing over the outer wall.

At 58, the liquid flows through the plurality of notches abutting the inner wall of the tank. This causes the liquid to move along the inner wall of a tank. In an example embodiment, the liquid flows like a continuous waterfall along the tank wall.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally, and equitably entitled.

The invention claimed is:

1. An apparatus comprising:
- a curved surface having an inner edge and an outer edge;
- an inner wall having a first height located at the inner edge of the curved surface;
- an outer wall located between the inner edge and outer edge of the curved surface and having a second height that is less than the first height;
- a plurality of notches located at the outer edge of the curved surface; and
- a feed pipe having an outlet located between the inner wall and outer wall.

2. The apparatus set forth in claim 1, wherein the outer edge of the curved surface is shaped to abut against an inner tank wall.

3. The apparatus set forth in claim 1, wherein the curved surface has a constant radius.

4. The apparatus set forth in claim 1, further comprising:
- wherein the curved surface is less than 360 degrees and having first and second ends;
- a first end cap located at the first end; and
- a second end cap located at the second end.

5. The apparatus set forth in claim 4, wherein the curved surface is semi-circular.

6. The apparatus set forth in claim 4, further comprising a first flange extending from the first end having a first mounting hole.

7. The apparatus set forth in claim 6, further comprising a second flange extending from the second end having a second mounting hole.

8. The apparatus set forth in claim 1, further comprising a second feed pipe having an outlet located between the inner wall and outer wall.

9. The apparatus set forth in claim 1, wherein the feed pipe further comprises a plurality of feed pipes.

10. The apparatus set forth in claim 1, further comprising a L-shaped bracket coupled with the inner wall and a lip of a tank.

11. The apparatus set forth in claim 10, further comprising a support bracket coupling the inner wall to an inner wall of the tank.

12. An apparatus, comprising:
- a first semi-circular, curved surface that comprises:
  - a first inner edge, and a first outer edge,
  - a first end and a second end,
  - a first end cap at the first end of the first semi-circular, curved surface,
  - a second end cap at the second end of the first semi-circular, curved surface,
  - a first inner wall having a first height,
  - a first outer wall located between the first inner edge and the first outer edge and having a second height that is less than the first height,
  - a first plurality of notches located at the first outer edge of the first curved surface, and
  - a first feed pipe having an outlet located between the first inner wall and the first outer wall;
- a second semi-circular, curved surface that comprises:
  - a second inner edge and a second outer edge,
  - a first end and a second end,
  - a first end cap at the first end of the second semi-circular, curved surface,
  - a second end cap at the second end of the second semi-circular, curved surface,
  - a second inner wall having a third height,
  - a second outer wall located between the first inner edge and the first outer edge and having a fourth height that is less than the third height,
  - a second plurality of notches located at the outer edge of the curved surface, and
  - a second feed pipe having an outlet located between the second inner wall and the second outer wall;
- wherein the first and second curved surfaces are shaped to abut against an inner tank wall;
- a first flange extending from the first end of the first semi-circular, curved surface having a first mounting hole;
- a second flange extending from the second end of the first semi-circular, curved surface, having a second mounting hole;
- a third flange extending from the first end of the second semi-circular, curved surface having a third mounting hole positioned to mate with the first mounting hole;
- a fourth flange extending from the second end of the second semi-circular, curved surface having a fourth mounting hole positioned to mate with the second mounting hole;
- a first fastener passing through the first mounting hole and second mounting hole coupling the first flange with the third flange; and
- a second fastener passing through the second mounting hole and the fourth mounting hole coupling the first flange with the fourth flange.

13. The apparatus set forth in claim 12, further comprising a third feed pipe having an outlet located between the first inner wall and first outer wall.

14. The apparatus set forth in claim 13, further comprising a fourth feed pipe having an outlet located between the second inner wall and second outer wall.

15. The apparatus set forth in claim 12, further comprising a first L-shaped bracket coupled with the first inner wall for mounting onto a lip of a tank.

16. The apparatus set forth in claim 15, further comprising a second L-shaped bracket coupled with the second inner wall for mounting onto the lip of the tank.

17. The apparatus set forth in claim 16, further comprising a first support bracket coupling the first inner wall to an inner wall of the tank.

18. The apparatus set forth in claim 17, further comprising a second support bracket coupling the first inner wall to an inner wall of the tank.

* * * * *